United States Patent

[11] 3,617,172

[72] Inventor Yutaka Hosoda
    Tokyo, Japan
[21] Appl. No. 741,224
[22] Filed June 28, 1968
[45] Patented Nov. 2, 1971
[73] Assignee Mitsui Kagaku Kogyo Kabushiki Kaisha
    (Mitsui Chemical Industry Co., Ltd.)
    Chuo-ku, Tokyo, Japan

[54] METHOD OF DYEING ALUMINUM-MODIFIED POLYPROPYLENE FIBERS WITH ANTHRAQUINONE DYES
    1 Claim, No Drawings
[52] U.S. Cl. .................................. 8/39,
    8/180, 260/380
[51] Int. Cl. .................................. D06p 1/24,
    C09b 1/28
[50] Field of Search .......................... 8/39,
    180–181; 260/380

[56] References Cited
    UNITED STATES PATENTS
    3,226,177 12/1965 Hosoda et al. .......... 8/180 X FOREIGN PATENTS
969,998 9/1964 Great Britain .............. 8/180

Primary Examiner—George F. Lesmes
Assistant Examiner—Patricia C. Ives
Attorney—Wenderoth, Lind & Ponack ABSTRACT: Method of dyeing polyolefin fibers which comprises applying anthraquinone dyes of a general formula

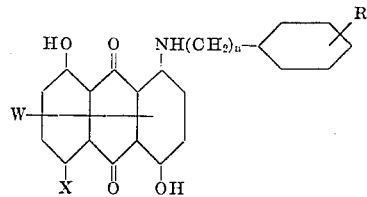

(in which X is nitro or amino group, W is hydrogen, chlorine or bromine atom, R is hydrogen atom or a lower alkyl group, and $n$ is an integer of 1–4) to metal-modified polyolefin fibers.

METHOD OF DYEING ALUMINUM-MODIFIED POLYPROPYLENE FIBERS WITH ANTHRAQUINONE DYES

This invention relates to method of dyeing metal-modified polyolefin fibers with anthraquinone dyes of the general formula

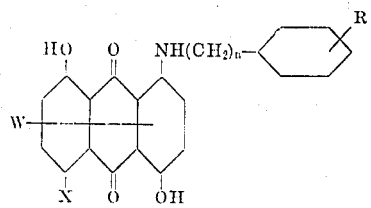

(1)

(in which X is nitro or amino group, W is hydrogen, chlorine or bromine atom, R is hydrogen atom or a lower alkyl group, and $n$ is an integer of 1–4).

The object of the invention is to provide a method of dyeing metal modified fibers, particularly polyolefin fibers, especially polypropylene fibers modified with aluminum compound, blue of excellent clarity and fastness.

As a means to improve the poor dye affinity of polypropylene fibers, a process has been proposed in which chelate-forming metal salts such as fatty acid salts of aluminum, nickel, zinc, etc. are incorporated with polypropylene fibers to form dyeable metal-modified polypropylene fibers, and thereafter the fibers are dyed with such dyestuffs which can form chelate ring with the above metals. The dyes of the invention are useful for fast dyeing such metal-modified fibers, and exhibit surprising effect particularly when applied to aluminium-modified fibers.

As clearly shown in the foregoing formula (1), the dyes of the invention have characteristic chemical structure in which an alkyl group is present between the imino group at $\alpha$-position of anthraquinone and benzene ring. Compounds lacking the alkyl group, that is, the compounds in which an anilino group is bonded at $\alpha$-position cannot give true blue when used for dyeing, but greenish blue. Whereas, as the result of thus having the alkyl group, the dyestuffs of the invention give true blue. Furthermore, due to the presence of the alkyl group, the dyes of the invention possess improved levelling property and light fastness.

Also the halogen atom at the $\beta$-position in the dyes of the invention is particularly effective when X is an amino group. That is, the halogen atom contributes for improving dyes affinity and light fastness.

The dyes of the invention are prepared as follows. 4,8-Dinitro-1,5-dihydroxyanthraquinone is reacted with an amine compound of the general formula

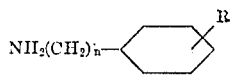

(2)

(in which R and n have the same significations as in formula (1)) to produce the dyestuffs of the general formula

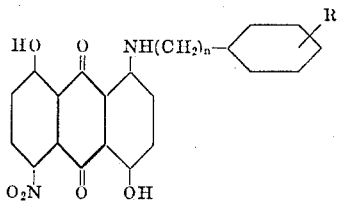

(3)

(in which R and $n$ have the same significations as in formula (1)). Also by reacting 4,8-diamino-1,5-dihydroxyanthraquinone with a chloride of the general formula

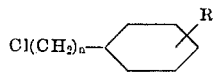

(4)

(in which definitions of R and $n$ are same to the foregoing), the dyestuffs of the general formula

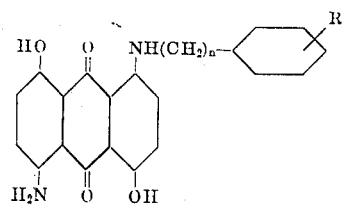

(5)

(in which definitions of R and $n$ are same to the foregoing) are obtained. Halogenizing the dyestuffs of formula (5), the dyestuffs of the general formula

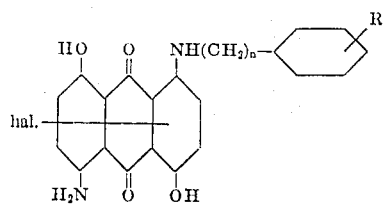

(6)

(in which hal. stands for chlorine or bromine atom, and definitions of R and $n$ are the same to the foregoing) are obtained.

According to this invention, the dyeing is carried out by bringing an effective amount of the aforesaid dyestuff into contact with a metal-modified polyolefin fiber in an aqueous suspension. In advance of the use of the dye, conveniently the dye is given a so-called comminution treatment by a suitable method consisting, for example, of dissolving the dye in 90–93 percent sulfuric acid at a low temperature, discharging into ice water, followed by filtering and washing to obtain a cake which is ground together with a cationic or anionic dispersing agent.

In dyeing metal-modified polypropylene fibers with the disperse dyes according to this invention, the basic procedure consists of dispersing the aforesaid finely divided dye at a bath ratio of 30–50 times based on the fibers, adjusting the pH to 3–6 in the presence of a suitable anionic or nonionic surfactant, dyeing the fibers for 20–90 minutes at 100–120° C., and thereafter washing the dyed fibers with water, followed by soaping or hydrosulfite cleaning. It is also possible to carry out the dyeing by the so-called thermosol method consisting of padding the aqueous dispersion to which has been added a nonionic surfactant and, after drying, submitting to a dry heat treatment for about 3 minutes at about 130° C.

The invention now will be explained with reference to the following examples, which are given solely for the illustrative purpose, but in no way limitative of the scope of the invention. In the examples, parts and percentages are by weight.

EXAMPLE 1

Fifty parts of 4,8-dinitro-1,5-dihydroxyanthraquinone was suspended in 500 parts of chlorobenzene. Further 20 parts of sodium carbonate was added to the suspension, followed by dropwise addition of 25 parts of benzylamine at 120° C., under stirring. The dropping required approximately an hour. During the subsequent 1–2 hours, the reaction was allowed to proceed at the same temperature. Water was added to the reaction mixture and chlorobenzene was removed therefrom by steam distillation. The precipitate was filtered, washed with water, then with dilute hydrochloric acid, and again with water, and dried. Forty-eight parts of a dyestuff having the following structural formula was obtained:

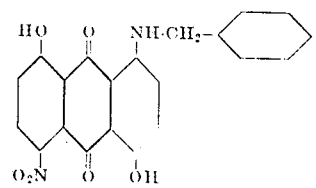

One part of the above powdery dyestuff was dissolved in 20 parts of 90 percent sulfuric acid at a temperature below 10°

C., and the solution was poured into 200 parts of water. Whereby formed precipitate was filtered, washed with water, and ground with 0.5 part of sodium dinaphthyl methanesulfonate. Thus a 10 percent dye paste was formed.

One part of the so obtained finely pasted dye was dispersed in 500 parts of water, to which were added 0.25 part of a nonionic surfactant prepared from nonyl phenol and ethylene oxide and 0.2 part acetic acid of 6° Be to prepare the dye bath. Ten parts of modified polypropylene containing 0.2 percent by weight of aluminum (basic aluminum stearate was incorporated) were dipped in this dye bath, which was then raised to 120° C. The dyeing was carried out for 1 hour, followed by water-washing of the dyed fibers. The fibers were then heated for 20 minutes at 85° C. in 500 parts of water in which had been dissolved 0.25 part of "Monogen" (sulfates of higher alcohol; registered trade name of Daiichi Kogyo Company, Japan), 0.5 part of caustic soda and 0.5 part of sodium hydrosulfite, followed by washing with water. The dyed product so obtained exhibited a clear marine blue, and its light fastnesses was 6, and drycleaning, nitrogen oxide gas, washing and crocking were in all cases a rating of 5. It was also fast to sublimation.

EXAMPLE 2

In the similar manner to the dyestuff preparation in example 1 except that the benzylamine was replaced by 28 parts of β-phenylethylamine, a dyestuff of the formula below was prepared.

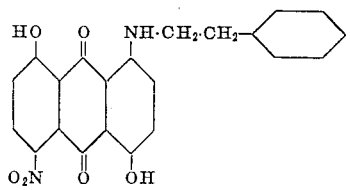

The above dye was used for dyeing aluminum-modified polypropylene fibers, with substantially the equivalent result to example 1.

EXAMPLE 3

In the similar manner to the dyestuff preparation in example 1 except that the benzylamine was replaced by 35 parts of 1-phenyl-3-aminobutane, a dyestuff of the following structural formula was prepared.

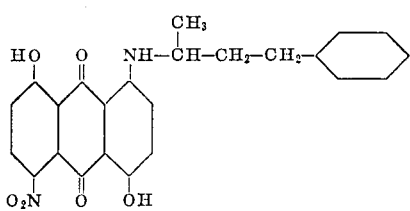

The above dye was used for dyeing aluminum-modified polypropylene fibers, with substantially the equivalent result to example 1.

EXAMPLE 4

In the similar manner to the dyestuff preparation in example 1 except that the benzylamine was replaced by 28 parts of p-xylylamine, a dyestuff of the formula below was prepared.

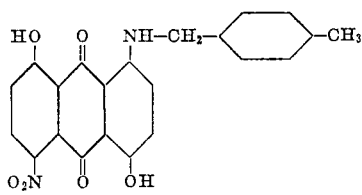

The above dyestuff was used for dyeing aluminum-modified polypropylene fibers, with substantially the equivalent result to example 1.

EXAMPLE 5

Fifty parts of 4,8-diamino-1,5-dihydroxyanthraquinone was suspended in 400 parts of o-dichlorobenzene. To the suspension then 20 parts of sodium carbonate and 100 parts of benzyl chloride were added, and the system was reacted for 8 hours at 140° C., followed by a steam distillation. The precipitate was filtered, dried and pulverized to yield 64 parts of dyestuff (A) of the formula below.

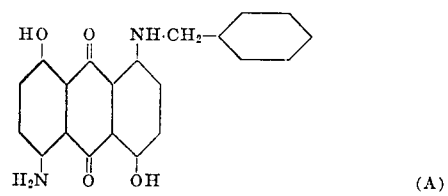

Fifty parts of the dyestuff (A) was dissolved in 250 parts of glacial acetic acid, and then 25 g. of bromine was added to the solution at 50° C. After 2 hours' subsequent stirring at the same temperature, the reaction mixture was discharged into water. Filtering and washing the precipitate with water, 57 parts (bromine content: 17 percent) of dyestuff (B) was obtained. The structural formula of the dyestuff (B) was as follows:

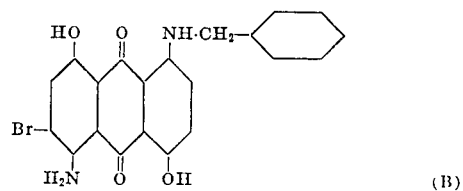

This dyestuff (B) was used for dyeing aluminum-modified polypropylene fibers to give a product dyed in clear blue of excellent light fastness. The dyestuff (B) exhibited better dyeing affinity and fastness properties compared with the dyestuff (A) which was not brominated.

EXAMPLE 6

Fifty parts of the dyestuff obtained in example 1 was suspended in 1,000 parts of water. After addition of 6 parts of caustic soda and 50 parts of sodium sulfide, the suspension was heated at 90° C. for an hour. The nitro group was reduced to amino group, and a dyestuff same to the dyestuff (A) of example 5 was obtained.

I claim:

1. A method of dyeing aluminum-modified polypropylene fibers which comprises applying an anthraquinone dye of the general formula:

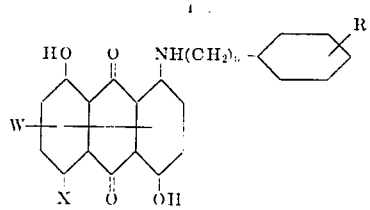

in which X is a nitro or amino group, W is hydrogen, chlorine or bromine, R is hydrogen or a lower alkyl group, and $n$ is an integer of 1–4, to aluminum-modified polypropylene fibers.

* * * * *